(12) United States Patent  
Kawabata et al.

(10) Patent No.: US 7,797,971 B2  
(45) Date of Patent: Sep. 21, 2010

(54) DRUM WASHING MACHINE

(75) Inventors: Shinichiro Kawabata, Seto (JP); Hisao Tatsumi, Nagoya (JP); Takeyuki Yabuuchi, Seto (JP)

(73) Assignees: Kabushiki Kaisha Toshiba, Tokyo (JP); Toshiba Ha Products Co., Ltd., Osaka-Fu (JP)

( * ) Notice: Subject to any disclaimer, the term of this patent is extended or adjusted under 35 U.S.C. 154(b) by 607 days.

(21) Appl. No.: 11/629,778

(22) PCT Filed: Apr. 14, 2005

(86) PCT No.: PCT/JP2005/007232

§ 371 (c)(1),  
(2), (4) Date: Dec. 15, 2006

(87) PCT Pub. No.: WO2005/124005

PCT Pub. Date: Dec. 29, 2005

(65) Prior Publication Data

US 2007/0137264 A1    Jun. 21, 2007

(30) Foreign Application Priority Data

Jun. 15, 2004    (JP) .............................. 2004-176986

(51) Int. Cl.  
*D06F 21/00*    (2006.01)  
*D06F 23/00*    (2006.01)  
*D06F 25/00*    (2006.01)

(52) U.S. Cl. ........................................ 68/140; 68/23.1

(58) Field of Classification Search ................. 68/23.1, 68/140  
See application file for complete search history.

(56) References Cited

U.S. PATENT DOCUMENTS 3,332,523 A * 7/1967 Chambers .................... 188/129

(Continued)

FOREIGN PATENT DOCUMENTS

CN    1275648    12/2000

(Continued)

OTHER PUBLICATIONS

Freyler, Adalbert, DE 2834649 A1, Feb. 1980, English machine translation.*

(Continued)

*Primary Examiner*—Michael Barr  
*Assistant Examiner*—Jason Y Ko  
(74) *Attorney, Agent, or Firm*—Pillsbury Winthrop Shaw Pittman, LLP

(57) ABSTRACT

A drum washing machine has a suspension for supporting a water tub for vibration proof. The suspension includes a cylindrical bearing support, a pair of bearings fixed in the bearing support, a shaft supported on the bearings so that the shaft is linearly reciprocated, a cylindrical friction member damping an amplitude of the water tub and disposed between the bearings so as to be immovable relative to the bearing support, and a lubricant applied between the shaft and the friction member. The friction member has both ends formed with abutment slant faces having outer diameters gradually reduced toward distal ends respectively. A pair of holding members are located in the bearing support for holding the ends of the friction member. Gaps are defined between the friction member and the holding members respectively. A plurality of lubricant reservoirs are defined in the respective gaps to reserve the lubricant.

2 Claims, 15 Drawing Sheets

U.S. PATENT DOCUMENTS

| | | | | |
|---|---|---|---|---|
| 3,866,724 | A | * | 2/1975 | Hollnagel ............... 188/129 |
| 4,729,458 | A | * | 3/1988 | Bauer et al. ............. 188/129 |
| 5,080,204 | A | * | 1/1992 | Bauer et al. ............. 188/129 |
| 5,946,946 | A | * | 9/1999 | Sharp et al. ............. 68/23.1 |

FOREIGN PATENT DOCUMENTS

| | | |
|---|---|---|
| CN | 1089148 | 8/2002 |
| CN | 1091228 C | 9/2002 |
| DE | 2834649 A1 * | 2/1980 |
| JP | 49-122169 | 11/1974 |
| JP | 52-124391 | 9/1977 |
| JP | 59-7782 U1 | 1/1984 |
| JP | 3-42715 | 4/1991 |
| JP | 06-063291 | 3/1994 |
| JP | 06063291 | 3/1994 |
| JP | 09-187596 | 7/1997 |
| JP | 10-274240 | 10/1998 |
| JP | 11-351317 | 12/1999 |
| JP | 2002-143594 | 5/2002 |
| JP | 2002-250341 | 9/2002 |
| JP | 2003159494 | 6/2003 |
| WO | WO 98/26194 | 6/1998 |
| WO | WO 98/30812 | 7/1998 |

OTHER PUBLICATIONS

Taiwanese Office Action dated Jan. 19, 2009.
Taiwanese Second Office Action for Taiwanese Patent Application No. 094119875 dated Jun. 3, 2009.
Notification of Reasons for Refusal of Japanese Patent Application No. 2004-176986 dated Sep. 15, 2009.

* cited by examiner

DRUM WASHING MACHINE

TECHNICAL FIELD

This invention relates to a drum washing machine in which a water tub accommodating a drum is supported by suspension for vibration proof.

BACKGROUND ART

Conventional drum washing machines comprises a horizontal axis type drum which is provided for accommodating laundry and which is rotatably mounted in a water tub in which wash water is reserved, as disclosed by JP-A-H09-187596. In this construction, the drum is supported via a shaft on bearings and rotated by an electric motor. The water tub is supported by a plurality of suspensions so that vibration produced in wash, dehydration and drying steps is prevented from direct transmission to an outer cabinet base (See patent document 1, for example).
Patent document: JP-A-H09-187596

DISCLOSURE OF THE INVENTION

For example, FIG. 13 illustrates a suspension 102 as one of the above-described suspensions. The suspension 102 has an oil damper 100 and a coil spring 101. The oil damper 100 comprises a cylinder 103 having an end 103a which is fixed to a bottom plate 104 of the water tub so as to be vibrated vertically together with the water tub. The cylinder 103 is filled with oil 105. A shaft 107 which is generally called "piston rod" has one end 107a which is fixed to a base 106 of an outer cabinet of the drum washing machine so as to axially correspond to the cylinder 103.

The shaft 107 has the other end 107b which is fluid-tightly inserted into the cylinder 103 and further has a distal end with an outer diameter substantially equal to an inner diameter of the cylinder 103. A disc 108 formed with a plurality of axial holes 108a is fixed to the distal end of the end 107b of the shaft 107. The disc 108 is generally called "piston valve." The cylinder 103 and the shaft 107 are provided with respective spring-receiving portions 109 and 110 located opposite to each other. The coil spring 101 is disposed between the spring-receiving portions 109 and 110 so as to be expanded and contracted. Consequently, the cylinder 103 and the shaft 107, namely, the bottom plate 104 and the base 106 are normally spaced away from each other.

In the above-described suspension 102, upon vertical vibration of the water tub, the cylinder 103 of the oil damper 100 is axially reciprocated (vertically vibrated) while the coil spring 101 is expanded and contracted. As a result, the shaft 107 is relatively reciprocated in the cylinder 103. With reciprocation of the shaft 107, the disc 108 is axially reciprocated in the oil 105 filling the cylinder 103, whereupon the oil 105 flows through the holes 108a formed through the disc 108. Consequently, a damping force is produced by the oil damper 100, acting to dampen vibration of the water tub. The damping force D thus produced is represented as the following equation (A):

Damping force $D$=entrance loss+frictional loss+dynamic pressure resistance (A)

where entrance loss is pressure loss caused when oil 105 flows into a hole 108a of a disc 108, frictional loss is pressure loss caused by pipe friction when oil 105 flows through the hole 108a, and dynamic pressure resistance is pressure loss due to unrecovered dynamic pressure on the rear face of the disc 108.

The entrance loss, frictional loss and dynamic pressure loss all producing the damping force D of the oil damper 100 is substantially proportional to the square of relative speed of the cylinder 103 and the disc 108. Furthermore, the aforesaid relative speed is proportional to a rotational frequency of the drum when the amplitude of the water tub is constant. Accordingly, a relation between the rotational frequency of the drum and the damping force D is represented as a quadric curve as shown in FIG. 14. More specifically, the damping force of the oil damper 100 has a characteristic that the damping force becomes larger as the rotational frequency of the drum is high.

In general drum washing machines, the vibration becomes steady after having passed a plurality of resonance points from start-up of dehydration. The vibration has amplitude depending upon a deviation amount ϵ of the rotation center of the drum and the gravity center of the drum. More specifically, the amplitude is increased when a deviation amount ϵ is large due to deviation of laundry in the drum in a low rotational frequency range of the drum, in which range the water tub resonates. The amplitude is decreased when a deviation amount ϵ is small after the resonance point has been passed and the deviation of laundry has been resolved in a high rotational frequency range of the drum. Accordingly, the oil damper 100 with the aforesaid characteristic is unsuitable for the drum washing machine having the above-described behaviors of vibration and amplitude.

A suspension 201 employing a friction damper 200 as shown in FIG. 15 is known as a means for overcoming the above-described problem. The friction damper 200 of the suspension 201 includes a cylinder 202 having one end 202a fixed to a bottom plate 203 of the water tub so that the cylinder 202 is vertically vibrated with the water tub. The drum washing machine includes a base 204 of an outer cabinet. A shaft 205 has one end 205a immovably fixed to the cylinder 202 so as to correspond to an axial direction of the cylinder 202. The shaft 205 has the other end 205b inserted into the cylinder 202. A porous friction member 206 is fixed to a distal end of the other end of the shaft 205 so as to be relatively slidable in the cylinder 202. A lubricant is applied to a surface of the friction member 206. A coil spring 209 is fixed to spring supports 207 and 208 provided on the cylinder 202 and the shaft 205 respectively so as to be located between the cylinder 202 and the shaft 205.

Upon vertical vibration of the water tub, the shaft 205 is relatively reciprocated (vertically vibrates) in the cylinder 202. With this, an inner circumference of the cylinder 202 and an outer circumference of the friction member 206 are slid such that a Coulomb friction is produced, whereupon the vibration of the water tub is damped. The damping force (Coulomb frictional force) E is shown as the following equation (B):

Damping force=$\mu N$ (B)

where $\mu$ is a coefficient of friction and N is a vertical drag. As obvious from equation (B), the damping force E of the friction damper 200 does not depend on the rotational frequency of the drum. Consequently, the suspension 201 with the friction damper 200 used is suitable for washing machines in which a rotational frequency of the drum changes.

However, the friction damper 200 has such a structure that only the outer circumference of the friction member 206 receives load (produced between the inner circumference of the cylinder 202 and the outer circumference of the friction member 206) resulting from the relative reciprocation of the shaft 205. Accordingly, there is a problem that the friction member 206 tends to be easily worn and has a low durability. Furthermore, air confined between the friction member 206 and the cylinder 202 acts as an air spring, which renders the characteristic instable. The cylinder 202 may be formed with an air hole (not shown) through which air is escaped. In this case, provision of the air hole reduces the strength of the cylinder 202, resulting in a new problem.

The present invention was made in view of the foregoing circumstance and an object of the present invention is to provide a drum washing machine which is provided with suspension from which an accurate damping force can be obtained according to the amplitude irrespective of the rotational frequency of the drum and which has a stable characteristic and durability.

Means for Overcoming the Problem

The present invention provides a drum washing machine which has a suspension for supporting a water tub for vibration proof, the water tub being enclosed in a drum, the suspension comprising a cylindrical bearing support; a pair of bearings fixed in an interior of the bearing support; a shaft supported on the bearings so that the shaft is linearly reciprocated relative to the bearings; a cylindrical friction member damping an amplitude of the water tub by a frictional force due to friction between the shaft and the friction member resulting from relative reciprocation of the shaft, the friction member being disposed between the bearings so as to be immovable relative to the bearing support; and a lubricant applied between the shaft and the friction member, wherein the friction member has both ends formed with abutment slant faces having outer diameters gradually reduced toward distal ends thereof, respectively, the drum washing machine further comprising a pair of holding members provided in the bearing support for holding the ends of the friction member; gaps are defined between the friction member and the holding members respectively; and a plurality of lubricant reservoirs are defined in the respective gaps to reserve the lubricant supplied between the shaft and the friction member.

Effect of the Invention

The damping force depends upon a frictional force between the shaft and the friction member in the drum washing machine of the invention. Consequently, an accurate damping force can be obtained irrespective of the rotational frequency of the drum. Furthermore, since the shaft reciprocated is supported on the bearing, the characteristic of the suspension can be stabilized and the durability thereof can be improved.

EXPLANATION OF REFERENCE SYMBOLS

Figure 1:
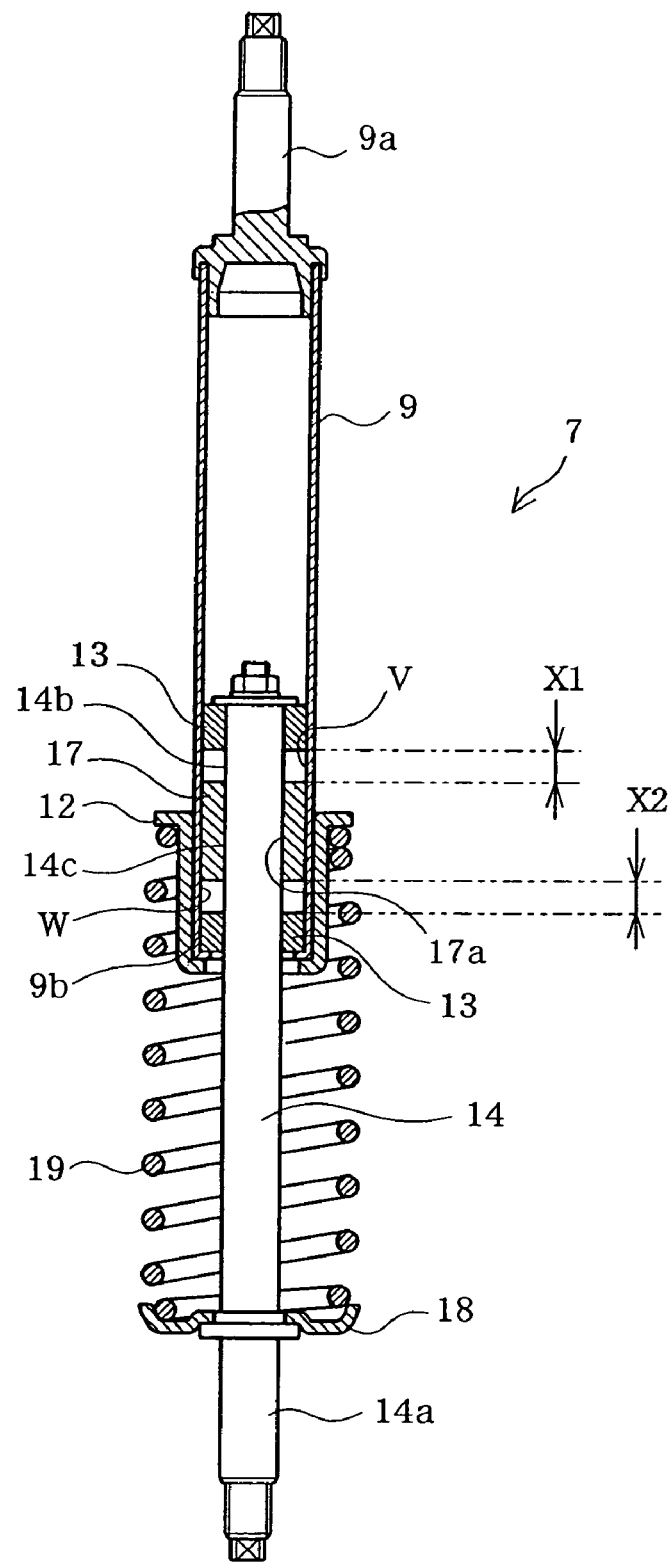
FIG. 1 is a longitudinally sectional side view of the suspension of a drum washing machine in accordance with a first embodiment of the invention.

Reference symbol 1 designates a drum washing machine, 5 a water tub, 6 a drum, 7 a suspension, 9 a cylinder (a bearing supporting member), 13 a bearing, 14 a shaft, 14c an outer circumference (of the shaft 14), 17 a friction member, 20 a friction member, 30 a friction member, 30c abutment slant faces, 40 a holding member, 40a holding sections, 50 a bearing, and X and Y air gaps.

BEST MODE FOR CARRYING OUT THE INVENTION

The invention will be described in more detail with reference to the accompanying drawings.

First Embodiment

A first embodiment of the present invention will be described with reference to FIGS. 1 to 4. Referring firstly to FIG. 2, an overall drum washing machine 1 (hereinafter referred to only as "washing machine") is shown. The washing machine 1 includes a rectangular cylindrical outer cabinet 2 forming an outer shell, a top cover 3 having an operation panel (not shown) and the like formed on a top thereof, and a base 4 located at the underside of the outer cabinet 2.

Figure 3:
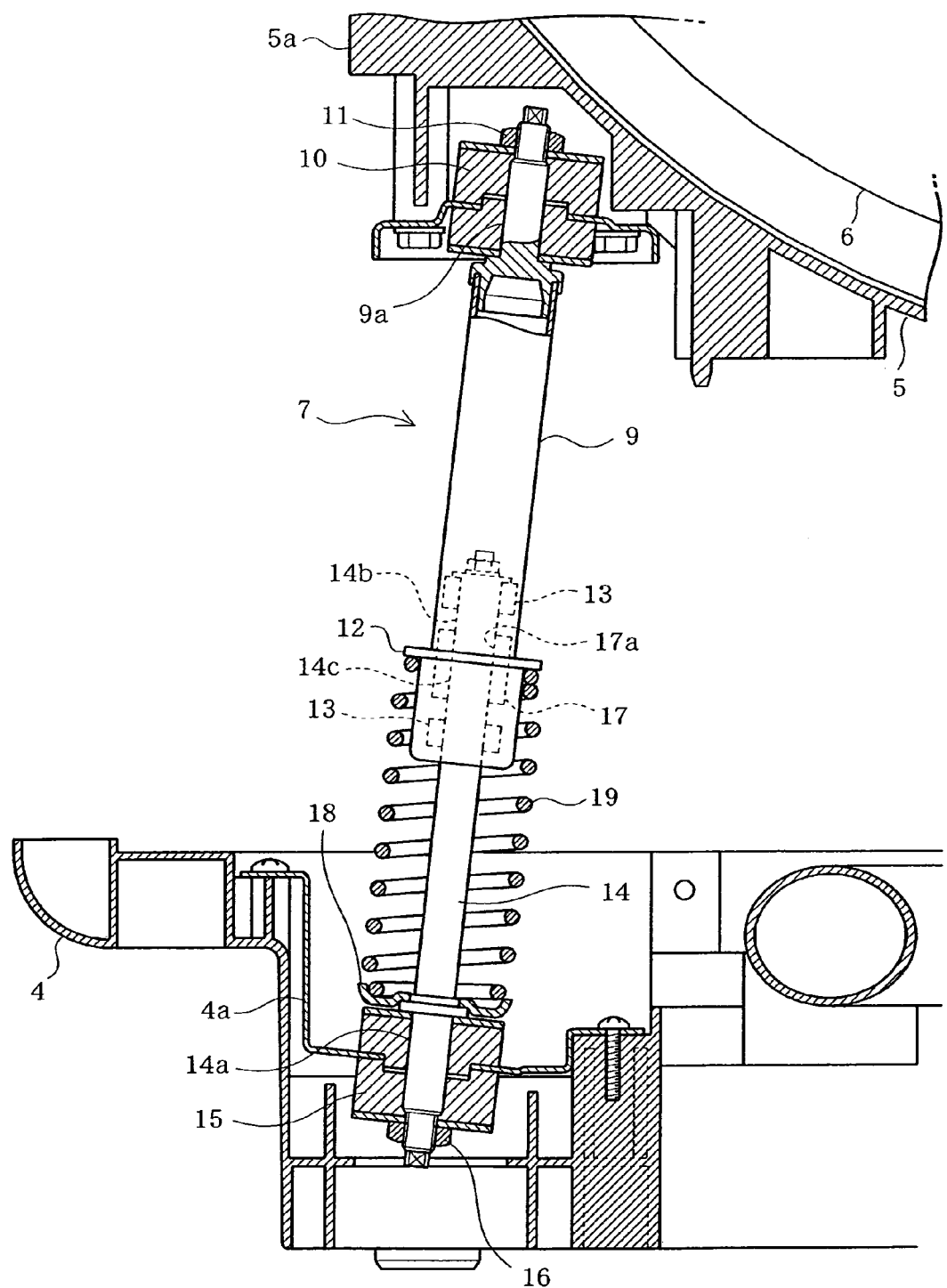
FIG. 3 is an enlarged view of the suspension and its periphery.

A cylindrical water-storable water tub 5 is provided in the outer cabinet 2. A drum 6 is provided in the water tub 5 so as to be rotatable about a horizontal axis. A plurality of, for example, four, suspensions 7 are provided between a bottom plate 5a of the water tub 5 and ends 4a of the base 4 respectively as shown in FIG. 3, whereby the water tub 5 is supported on the base 4 of the outer cabinet 2 in a vibration-proof manner. The construction of the suspension 7 will be described later.

The drum 6 includes a circumferential wall formed with a number of holes (not shown) and is generally formed into a cylindrical shape. The drum 6 is rotated by a known direct drive motor 8 mounted on an outer wall of the water tub 5, so that a wash operation, a dehydration operation and the like are carried out for laundry (not shown). A lid 3a is mounted on the top cover 3 so as to be opened and closed. Laundry can be put into the drum 6 when the lid 3a is opened.

Figure 2:
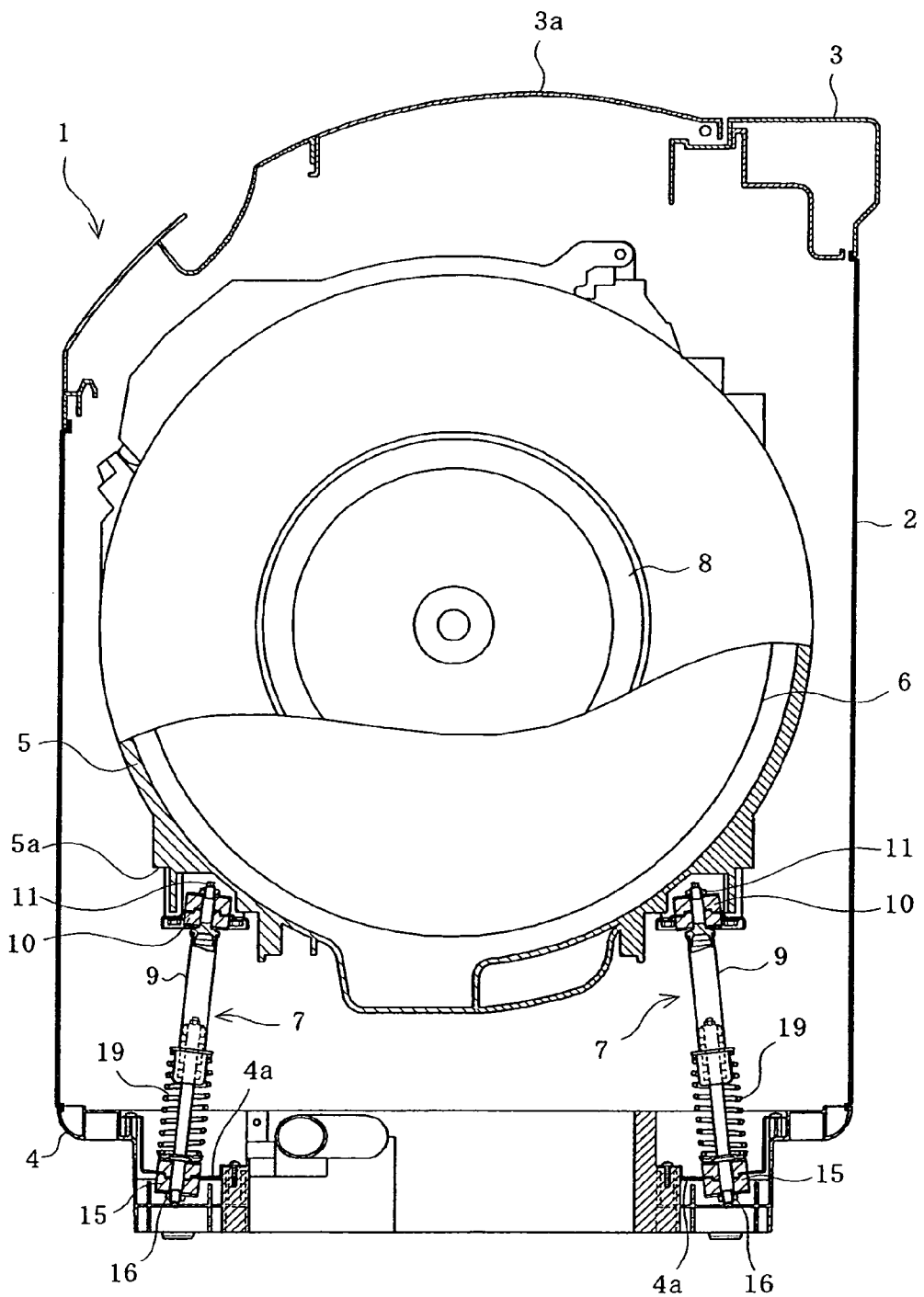
FIG. 2 is a partially broken side view of the drum washing machine.

Each of the suspensions 7 supporting the water tub 5 in the vibration-proof manner has a cylinder 9 serving as a cylindrical bearing support, as shown in FIG. 1. The cylinder 9 has one end 9a fixed, for example, via a first vibration-proof member 10 to the bottom plate 5a of the water tub 5 by a nut 11, as shown in FIG. 3, whereby the end 9a is vertically vibrated together with the water tub 5. The cylinder 9 has the other end 9b having an outer circumference with which a cylinder-side spring support 12 is fitted. A pair of bearings 13 are fixed so as to be axially spaced away from each other in an interior of the cylinder 9 at the end 9b side. Each bearing 13 is made of a sintered oil-immersed metal (bearing alloy) and a force-fitting metal (backing metal).

A shaft 14 constituting each suspension 7 together with the cylinder 9 has one end 14a fixed, for example, via a second vibration-proof member 15 to the end 4a of the base 4 by a nut 16 so as to axially correspond to the cylinder 9 (see FIG. 3). The shaft 14 has the other end 14b inserted via the bearings 13 into the cylinder 9 as shown in FIG. 1. A cylindrical friction member 17 is provided on a part of the shaft 14 near the distal end of said other end 14b so as to be located between the bearings 13. The friction member 17 is slidable on the outer circumference 14c of the shaft 14 and elastically deformable. The friction member 17 is made of a resin such as synthetic rubber. The friction member 17 has an axial dimension which is shorter than a distance between the bearings 13 and has such a diameter as to be non-contact with the inner circumference of the cylinder 9. As a result, a pair of upper and lower air gaps (gaps) V and W are normally formed between the friction member 17 and the bearings 13. Reference symbols X1 and X2 designate axial dimensions of the air gaps V and W.

A wearproof lubricant is applied between the friction member 17 and the shaft 14 or sliding portions (sliding faces) of the members. The lubricant preferably contains molybdenum (Mo), for example. The reason for this is that slight irregularity is microscopically found on the sliding faces although there is almost no gap between the inner circumference of the friction member 17 and the outer circumference 14c of the shaft 14 macroscopically. In other words, since molybdenum has a grain diameter in the order of several µm, molybdenum enters the air gaps of irregularity of the sliding faces to exhibit wearproof effect.

A shaft-side spring support 18 is fitted with an outer circumference 14c of the shaft 14 near the end 14a so as to be opposed to the cylinder-side spring support 12 in the axial direction. A coil spring 19 is provided between the shaft-side spring support 18 and the cylinder-side spring support 12 so as to be wound around a part of the cylinder 9 and a part of the shaft 14 and so as to be expanded and contracted. As a result, the cylinder 9 and the shaft 14, namely, the bottom plate 5a and the base 4 are normally spaced away from each other.

Upon vertical vibration of the water tub 5, the cylinder 9 is axially reciprocated (vertically vibrated) while the coil spring 19 is expanded and contracted. As a result, the shaft 14 is relatively reciprocated in the cylinder 9. In this case, when the amplitude of the water tub 5 is smaller than either axial dimension X1 or X2 of the air gap V or W, the friction member 17 is reciprocated together with the shaft 14, whereupon no damping force acts. The amplitude of the water tub 5 is damped by a damping force produced by expansion and contraction of the coil spring 19.

On the other hand, when the amplitude of the water tub 5 is larger than either axial dimension X1 or X2 of the air gap V or W, a damping force is produced by the friction between the shaft 14 and the friction member 17. The damping force thus produced will be described with reference to FIG. 4. An axis of ordinates designates a damping force and an axis of abscissas designates an amount of displacement of the shaft 14 in FIG. 4. For the purpose of simplifying the explanation, the shaft 14 is to be vertically reciprocated at amplitude larger than X1 (X2) when stopped at a position where the friction member is equidistant from both bearings 13 or X1=X2.

Figure 4:
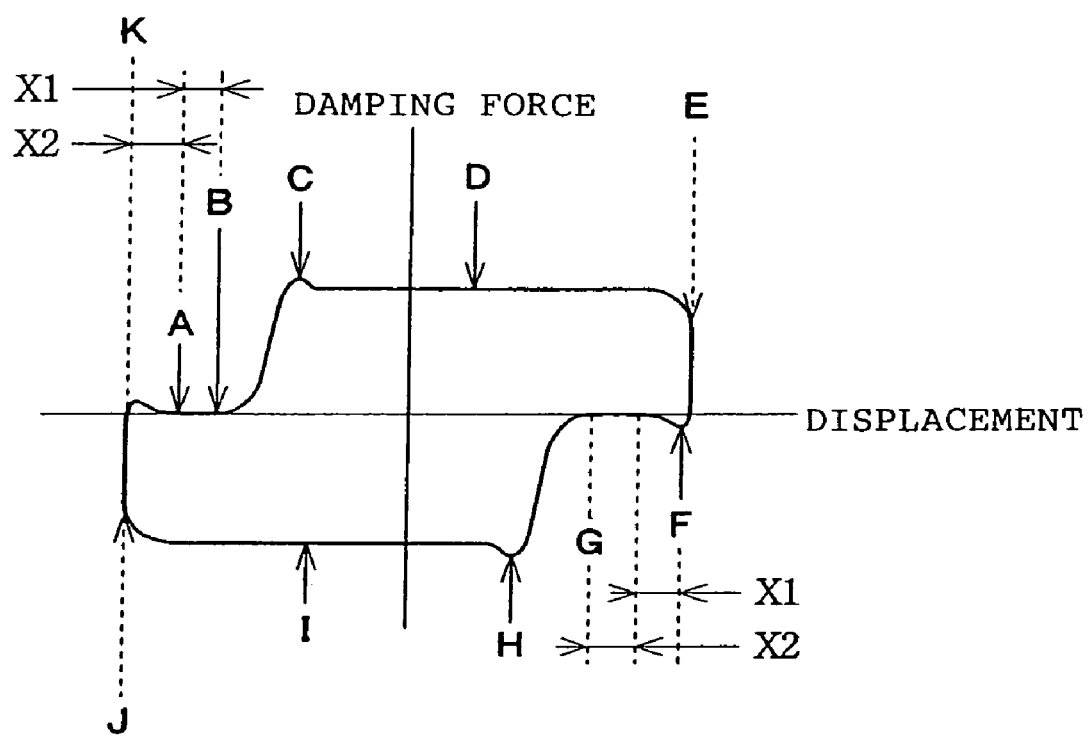
FIG. 4 is a graph showing the relationship between the displacement of a shaft and damping force.

When point A designates the stopped state of the shaft 14 in FIG. 4, the shaft 14 starts its first half movement of reciprocation (upward movement), so that the friction member 17 is moved upward together with the shaft 14. When a distance of the upward movement of the shaft 14 reaches X1, the friction member 17 abuts against the upper bearing 13 (point B in FIG. 4). As a result, the upward movement of the friction member 17 is interrupted and the air gap V disappears.

When the shaft 14 is continuously moved upward, the inner circumference 17a of the friction member 17 is slid on the outer circumference 14c of the shaft 14. Consequently, a damping force is produced on the basis of Coulomb friction the shaft 14 receives from the friction member 17. A damping force acting in a direction opposite to the first half movement of the reciprocation will hereinafter be referred to as "positive damping force." The positive damping force is shown a region upper than the abscissa in FIG. 4. The positive damping force reaches an instantaneous peak (point C in FIG. 4) and thereafter reduces to a constant value (point D in FIG. 4). The reason for this change is that a peak of the upward elastic deformation is reached when the shaft 14 is moved with the inner circumference 17a of the friction member 17 dragging and thereafter, elastic deformation is slightly relaxed by a recovering force of the friction member 17.

Upon stop of the upward movement of the shaft 14, the positive damping force is rapidly reduced to zero (point E in FIG. 4). When the shaft 14 starts a relative second half movement (downward movement in FIGS. 1 and 3 of the reciprocation, a damping force (hereinafter, "negative damping force") in the direction opposite the positive damping force is instantaneously produced (point F in FIG. 4). The shaft 14 is instantaneously moved downward relative to the inner circumference 17a of the friction member 17 elastically deformed into a predetermined shape in abutment with the upper bearing 13. As a result, the outer circumference 14c of the shaft 14 drags the inner circumference 17a of the friction member 17 downward such that the inner circumference 17a is recovered from the elastic deformation and the outer circumference 14c and the inner circumference 17a are moved downward together. The negative force is produced in this case or when the outer circumference 14c and the inner circumference 17a are moved downward together.

The friction member 17 abuts against the lower bearing 13 when a distance of the downward movement (as shown in FIGS. 1 and 3) of the shaft 14 and the friction member 17 becomes equal to a sum of axial dimensions of the air gaps V and W or X1+X2 (point G in FIG. 4). As a result, the downward movement of the friction member 17 is interrupted and the air gap W disappears.

When the shaft 14 is continuously moved downward, the friction member 17 and the shaft 14 are slid on each other, whereby the negative damping force is produced. The negative damping force reaches an instantaneous peak (point H in FIG. 4) and thereafter reduces to a constant value (point I in FIG. 4). Upon stop of the downward movement of the shaft 14, the negative damping force is rapidly reduced to zero (point J in FIG. 4). When the shaft 14 starts an upward movement, the positive damping force is instantaneously produced (point K in FIG. 4). The positive damping force is produced in the same action as at point F. Subsequently, the shaft 14 is returned to point A, repeating the same action.

In the foregoing embodiment, the damping force is produced by the coil spring 19 when the amplitude of each suspension 7 is small. The damping force is produced by the coil spring 19 and the friction member 17 when the amplitude is large. Accordingly, a suitable damping force according to the amplitude can be produced irrespective of a rotational frequency of the drum 6. Furthermore, since the lubricant is applied between the shaft 14 and the friction member 17, each member can be prevented from an excessive friction, whereupon a stable damping force can be obtained and the friction member 17 can be prevented from being worn out. Additionally, since the friction member 17 is made from elastically deformable rubber, an amount of impulsive sound produced can be reduced when the friction member 17 abuts against the bearings 13.

Figure 13:
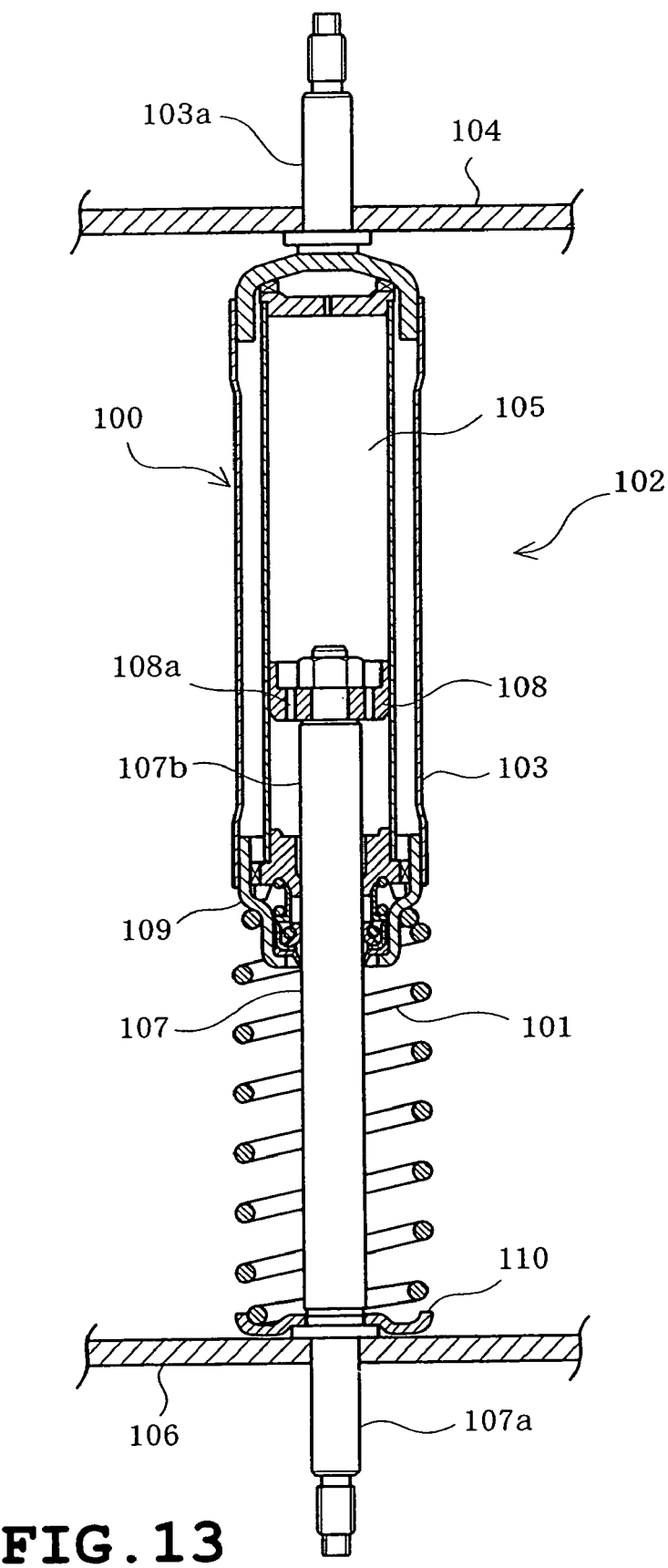
FIG. 13 is a view similar to FIG. 1, showing a first conventional example.
Figure 14:
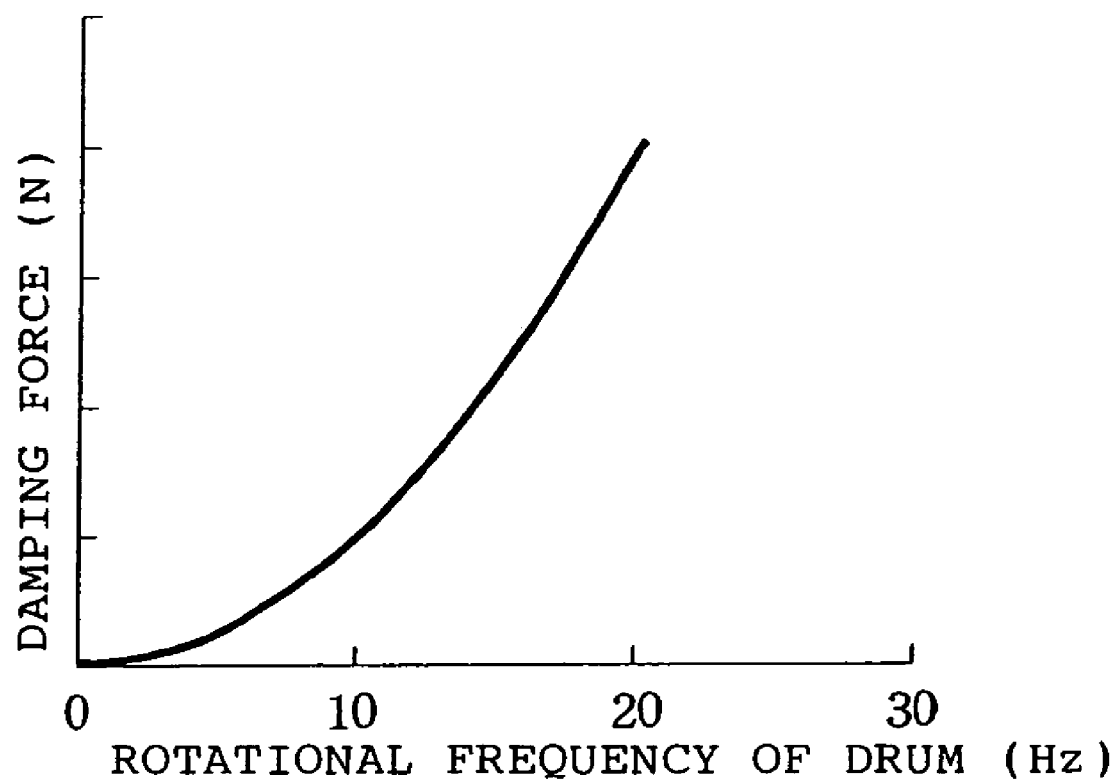
FIG. 14 is a graph showing the relationship between the damping force and the rotational frequency of the drum in a conventional suspension.
Figure 15:
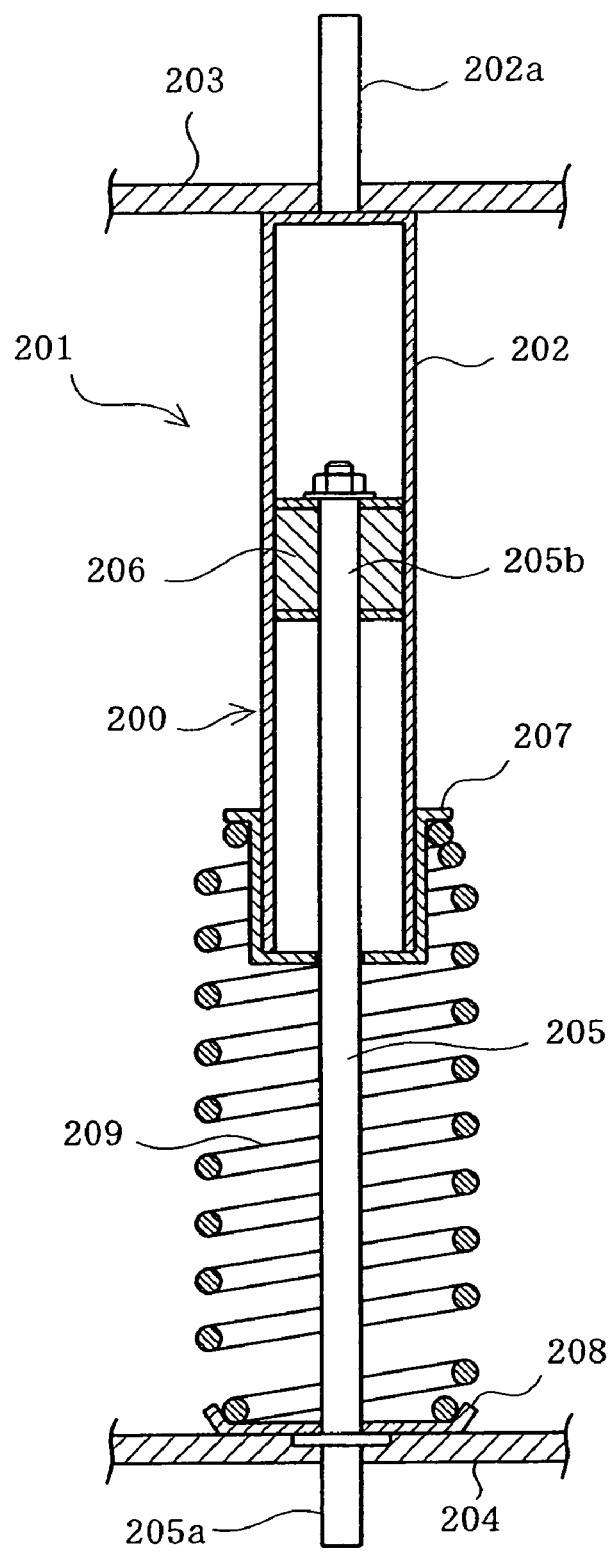
FIG. 15 is a view similar to FIG. 1, showing a second conventional example.

Furthermore, the shaft 14 is supported by the paired bearings 13. Accordingly, since the load of the water tub 5 is dispersively received by the bearings 13, the characteristic of each suspension 7 can be rendered stable and each suspension 7 can be rendered durable. Furthermore, the shaft 14 is reciprocated in the cylinder 9 but a piston valve (see FIGS. 13 and 15) having an outer diameter substantially equal to the inner diameter of the cylinder 9 is not reciprocated in the cylinder 9. Consequently, a cubic volume of air compressed in the cylinder 9 can be reduced and the damping force can be rendered stable with reduction in an effect of air spring.

The distance between the bearings 13 may be changed according to the amplitude of the water tub 5, the lengths of the shaft 14 and the friction member 17 or the timing of the amplitude.

Second Embodiment

Figure 5:
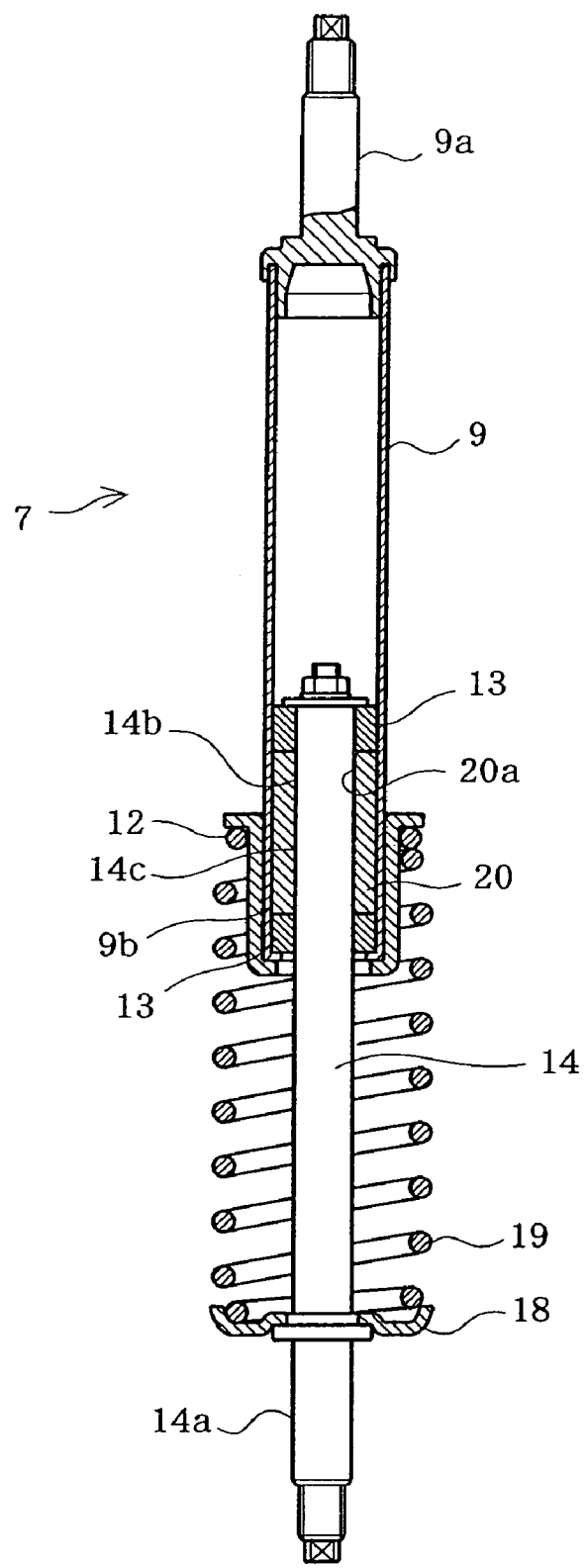
FIG. 5 is a view similar to FIG. 1, showing a second embodiment of the invention.
Figure 6:
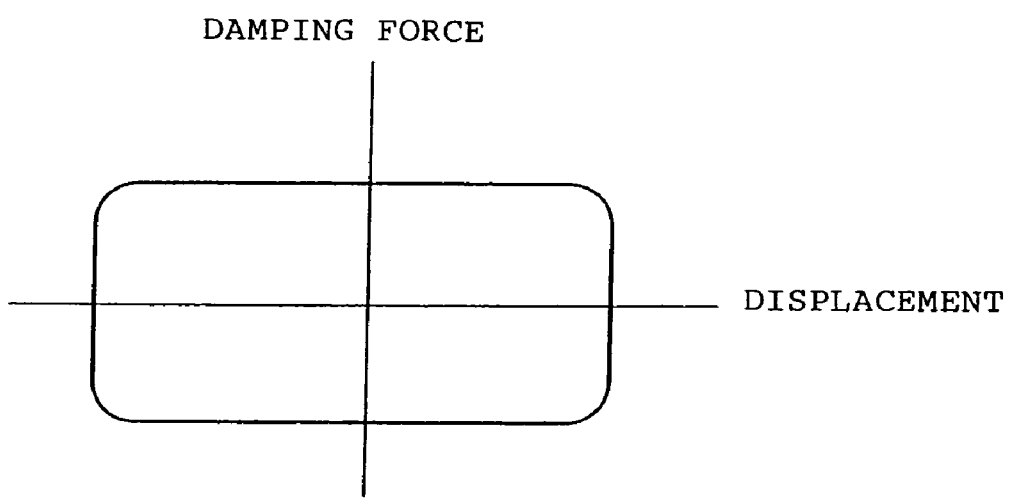
FIG. 6 is a view similar to FIG. 4.

FIGS. 5 and 6 illustrate a second embodiment of the invention. In the second embodiment, identical or similar parts are labeled by the same reference symbols as in the first embodiment and detailed description of these parts will be eliminated. The friction member 20 has an axial dimension equal to the distance between the bearings 13. Accordingly, no gap is left between the bearings 13. In other words, the friction member 20 is disposed between the bearings 13 so as to be immovable relative to the cylinder 9. The friction member 20 is identical with the friction member 17, and the lubricant is applied between the inner circumference 20a of the friction member 20 and the outer circumference 14c of the shaft 14.

The outer circumference 14c of the shaft 14 and the inner circumference 20a of the friction member 20 are normally sliding on each other. As a result, since a smooth positive or negative damping force is obtained as shown in FIG. 6, the amplitude of the water tub 5 can be reduced. Furthermore, the reciprocation of the shaft 14 does not cause the friction member 20 to abut against the both bearings 13. Accordingly, a further noise reduction can be achieved in the washing machine 1.

Third Embodiment

Figure 7:
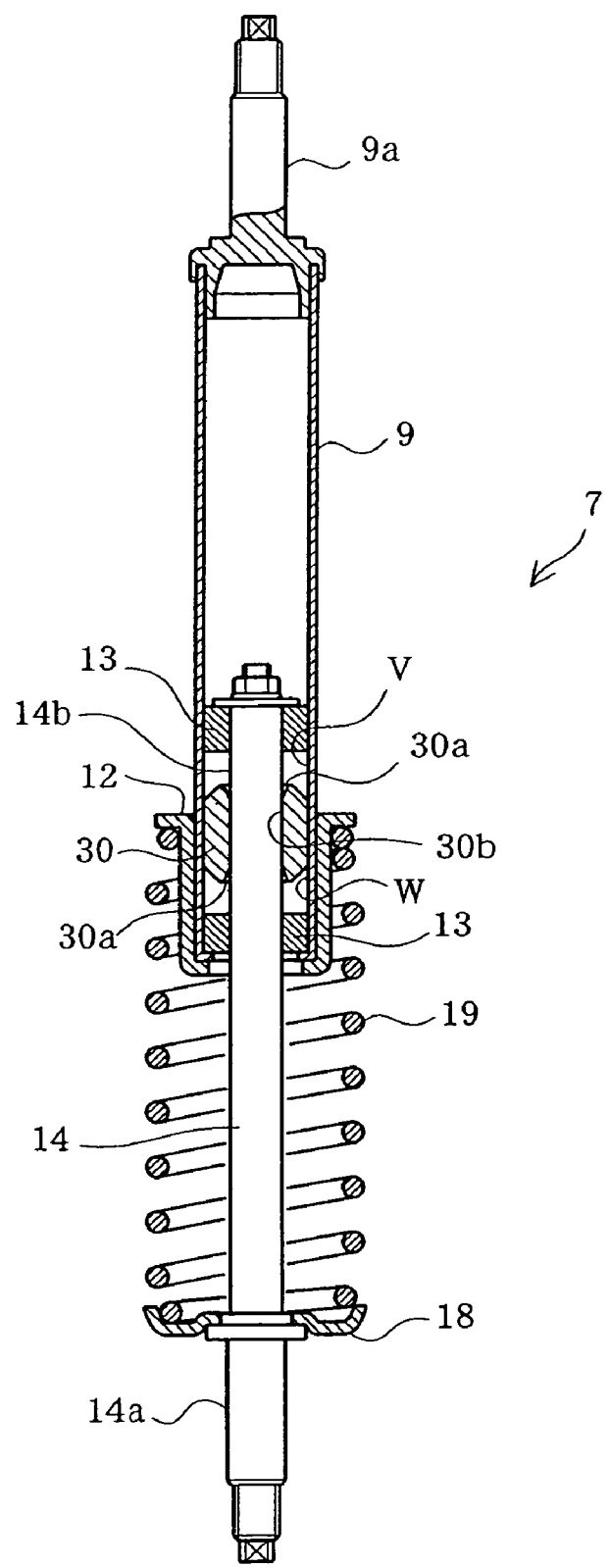
FIG. 7 is a view similar to FIG. 1, showing a third embodiment of the invention.

FIG. 7 illustrates a third embodiment of the invention. In the third embodiment, identical or similar parts are labeled by the same reference symbols as in the first embodiment and detailed description of these parts will be eliminated. The friction member 30 has an inner circumference with both ends (axial ends) formed with lubricant introducing portions 30a respectively. The lubricant introducing portions 30a have diameters gradually increased toward the distal ends respectively. The friction member 30 further has a parallel portion 30b which is located in an axial center of the friction member 30 and continuous to the lubricant introducing portions 30a and parallel to the shaft 14. In other words, the lubricant introducing portions 30a are formed so as to become depressed toward the parallel portion 30b. The parallel portion 30b of the friction member 30 is adapted to slide on the shaft 14. The friction member 30 is identical with the friction member 17, and the lubricant is applied to the parallel portion 30b (inner circumference).

The lubricant adherent to the shaft 14 tends to easily penetrate into the parallel portion 30b (sliding surface) from the introducing portions 30a depressed toward the parallel portion 30b. As a result, the lubricity can be improved on the sliding surface and accordingly, the friction member can be prevented from being worn.

The friction member 30 has an outer diameter gradually reduced toward axial ends such that both ends thereof are formed into a truncated conical shape. However, a shape of the outer circumference of the friction member 30 should not be limited even if both axial ends of each introducing portion are formed with the lubricant introducing portions 30a whose diameters are gradually increased toward both ends. The shape of outer circumference of the friction member 31 should not be limited. Furthermore, an inclination of the lubricant introducing portions 30a may be changed, and the axial dimension of the parallel portion 30b or the axial dimension of the friction member may be changed.

Fourth Embodiment

Figure 8:
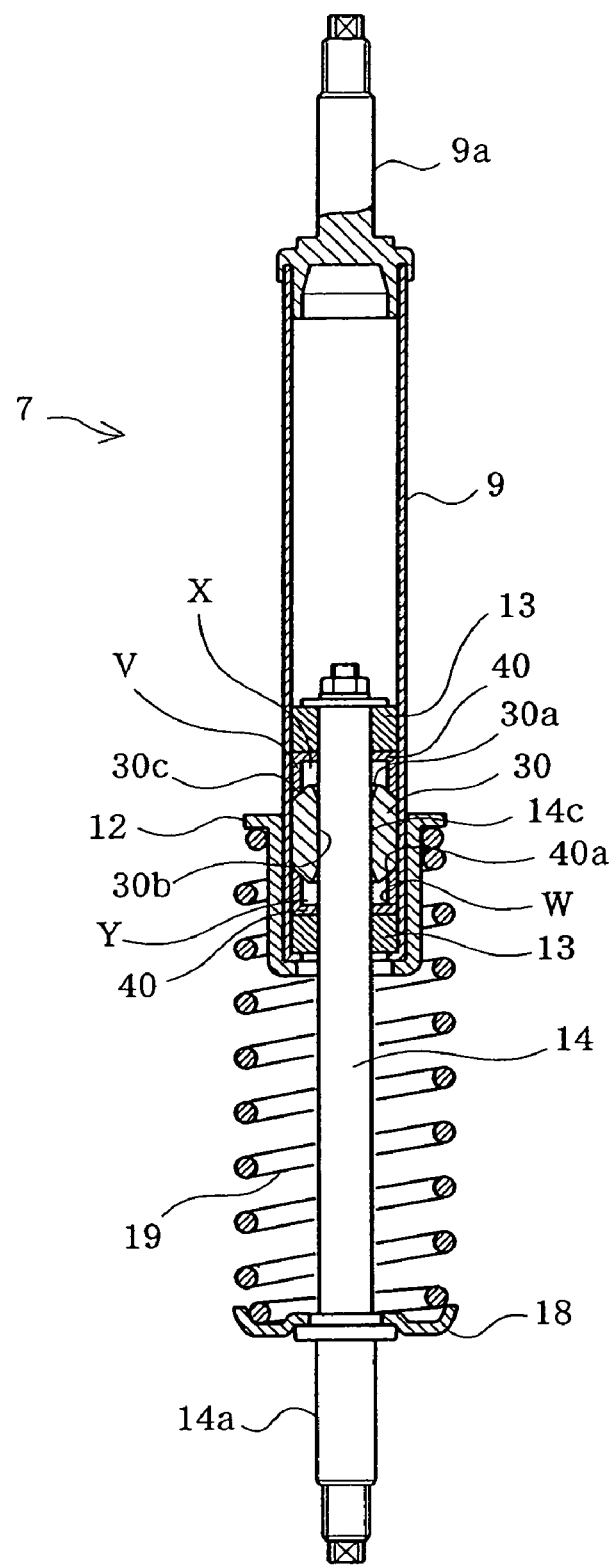
FIG. 8 is a view similar to FIG. 1, showing a fourth embodiment of the invention.

FIG. 8 illustrates a fourth embodiment of the invention. In the fourth embodiment, identical or similar parts are labeled by the same reference symbols as in the second embodiment and detailed description of these parts will be eliminated. A pair of holding members 40 are provided in the air gaps V and W defined between the friction member 30 and the upper and lower bearings 13. Each holding member 40 is held between the bearing 13 and the friction member 30 so as to be immovable, that is, the holding members 40 are located at both end sides of the friction member 30 respectively.

The outer circumference of the friction member 30 has abutment slant faces 30c having outer diameters gradually reduced toward distal ends thereof, respectively (that is, the same shape as in the third embodiment). The holding members 40 have holding sections 40a which abut against the abutment slant faces 30c thereby to hold the friction member 30. The holding members 40 are constructed to be brought into face-to-face contact with each other. Air gaps X and Y defined by the friction member 30 and the holding members 40 in the cylinder 9 are filled with a lubricant.

For example, when the shaft 14 is moved in a first half of the reciprocation, the abutment slant faces 30c of the friction member 30 are pressed strongly against the holding portions 40a of the holding members 40 located upward. In this case, each abutment slant face 30c has an outer diameter gradually increased from the upper part to the lower part, and the abutment slant faces 30c and the holding portion 40a are in a face-to-face contact with each other. Accordingly, when pressed against the holding members 40 respectively, the abutment slant faces 30c are depressed in such a direction that the shafts 14 are fastened. Consequently, the shaft 14 is fastened with the inner diameter of the friction member 30 being slightly reduced, whereupon a larger damping force can be obtained. Additionally, the same effect can be achieved from the second half of the reciprocation.

Furthermore, when the air gaps X and Y between the friction member 30 and the holding members 40 are filled with the lubricant, the sliding surfaces are normally lubricated. As a result, a desired lubrication can be maintained and wear-out of the friction member 30 caused by volatilization or leak of the lubricant can be prevented.

Fifth Embodiment

Figure 9:
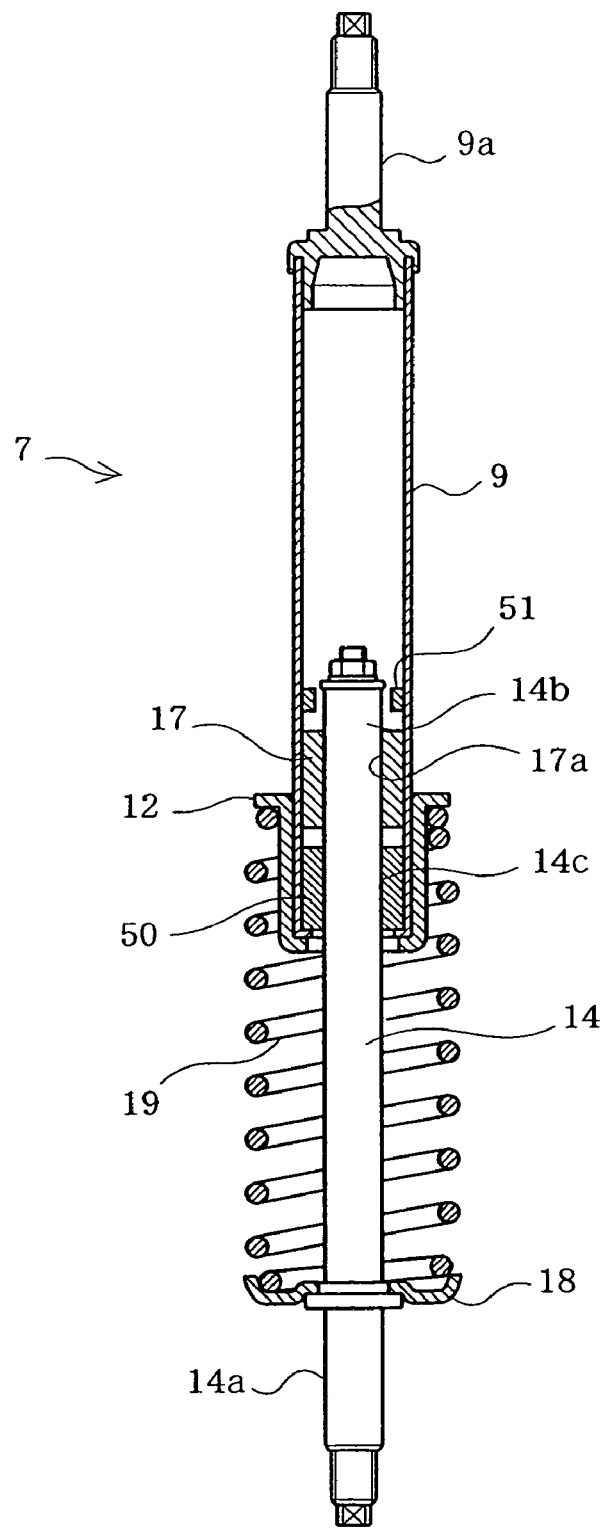
FIG. 9 is a view similar to FIG. 1, showing a fifth embodiment of the invention.

FIG. 9 illustrates a fifth embodiment of the invention. In the fifth embodiment, identical or similar parts are labeled by the same reference symbols as in the first embodiment and detailed description of these parts will be eliminated. An axially elongated bearing 50 is fixed so as to be located below the friction member 17 in the cylinder 9 (as viewed in FIG. 9), and a limiting member 51 is fixed so as to be located over the friction member 17 (as viewed in FIG. 9). The limiting member 51 limits an upward relative movement of the friction member 17. The limiting member 51 is formed into an annular shape and located so as to be non-contact with the shaft 14. The friction member 17 abuts against the shaft 14 when the shaft 14 is moved in the second half movement in the reciprocation.

Since the bearing 50 is axially elongated, only the lower bearing 50 is provided below the friction member 17. Consequently, the structure of the suspension 7 can be simplified, and the same damping force as in the previous embodiments can be obtained without reduction in the bearing performance.

The limiting member 51 limits the second half movement of the reciprocation with the second half movement of the shaft 14. The shape of the limiting member 51 should not be limited if the limiting member 51 is stopped. For example, the limiting member 51 may be a mere convex portion. Furthermore, the limiting member 51 may be formed integrally with the cylinder 9. Furthermore, when the limiting member 51 is fixed to a constricted part of the cylinder 9, the first half movement of the friction member 17 in the reciprocation can be stopped without use of the limiting member 51.

Sixth Embodiment

Figure 10:
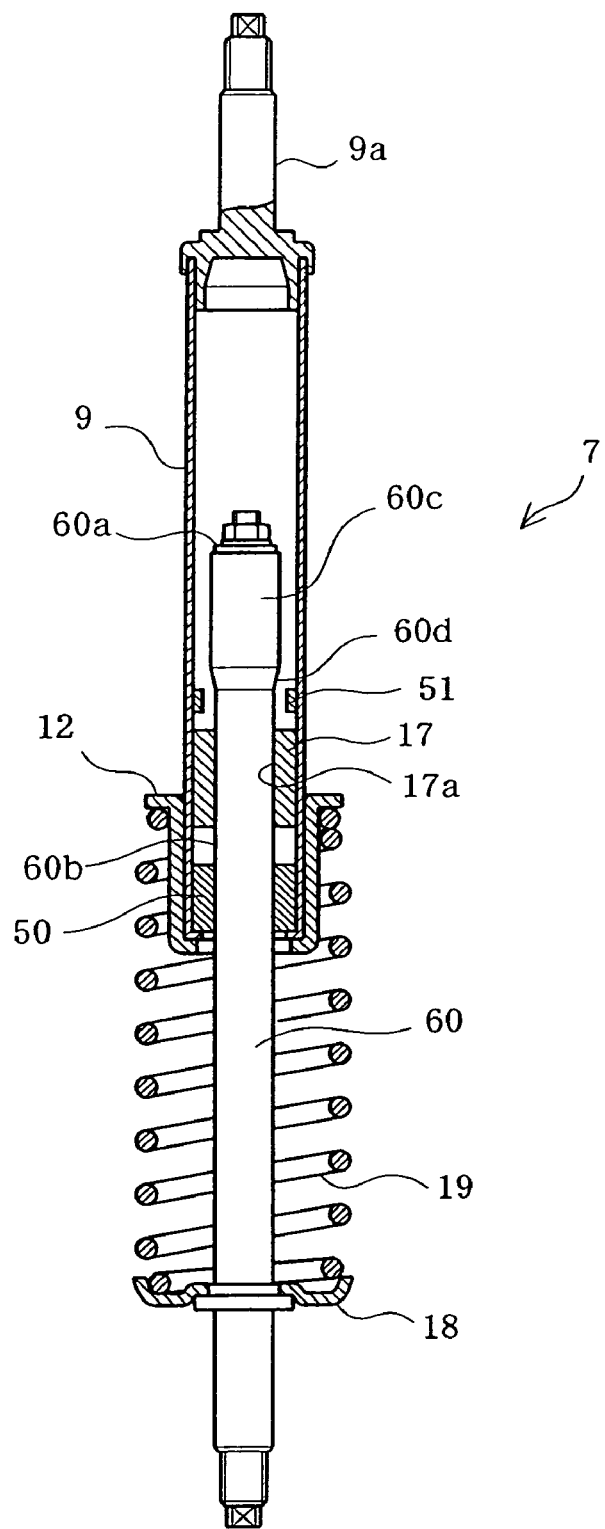
FIG. 10 is a view similar to FIG. 1, showing a sixth embodiment of the invention.

FIG. 10 illustrates a sixth embodiment of the invention. In the sixth embodiment, identical or similar parts are labeled by the same reference symbols as in the fifth embodiment and detailed description of these parts will be eliminated. A larger diameter portion 60c is formed on the upper end 60a (upper end as viewed in FIG. 10) of the shaft 60. The larger diameter portion 60c has a larger diameter than the other shaft portion 60b (hereinafter, "shaft parallel portion") of the shaft 60. An inclined surface 60d with a gentle inclination is formed between the larger diameter portion 60c and the shaft parallel portion 60b. The larger diameter portion 60c is formed so as to be non-contact with the limiting member 51 even when the shaft 60 is reciprocated. The larger diameter portion 60c is formed so as to be located at a position where normally expected amplitude of the water tub 5 is exceeded in the shaft 60.

For example, a damping force due to normal friction of the shaft parallel portion 60b and the friction member 17 can be obtained in the case of normally expected amplitude of the water tub 5 in the occurrence of an unbalanced condition in a dehydration step. However, in the case of abnormal amplitude exceeding the normally expected amplitude of the water tub 5, the inner circumference 17a of the friction member 17 slides on the outer circumference of the larger diameter portion 60c (including the inclined surface 60d). As a result, the damping force becomes large and can limit further increase in the amplitude of the shaft 60 (water tub 5).

Accordingly, the washing machine 1 can be prevented from being adversely affected by abnormal amplitude of the water tub 5 or the suspension 7 can be prevented from being broken. Additionally, a suitable change may be possible according to an object in the diameter of the larger diameter portion 60c, the location of the larger diameter portion 60c and presence or absence of the inclined surface 60d or the friction member corresponding to the shaft 60 having the larger diameter portion 60c within a range not departing from the scope of the invention.

Figure 11A:
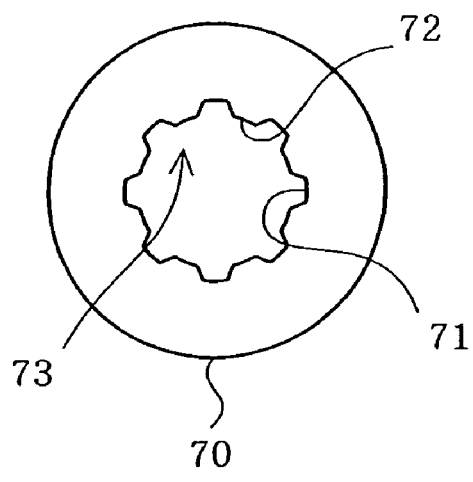
FIG. 11 shows a modified form of the friction member, and (a) is a front view and (b) is a side view.
Figure 11B:
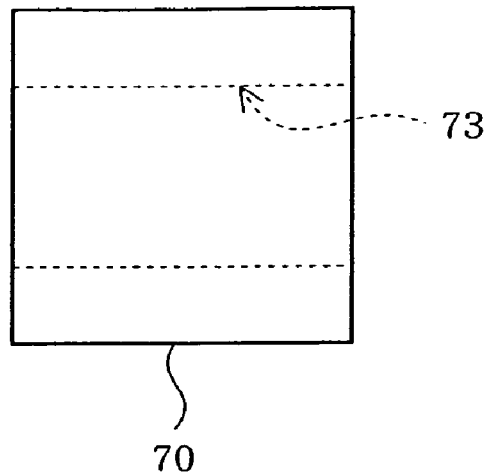

Other Modified Forms:

In modified forms, the friction member 70 may be formed with a plurality of concave portions 71 and convex portions 72 axially extending relative to the inner circumferential surface thereof, as shown in FIG. 11. In this case, the convex portions 72 slide on the shaft so that a frictional force or damping force is produced. The concave portions 71 are not brought into contact with the shaft. Consequently, the concave portions 71 serve as lubricant reservoirs reserving the lubricant for the sliding surfaces of the shaft 14 and the friction member 70. Accordingly, the lubricant can be prevented from being used up on the sliding surface and accordingly, the friction member can be prevented from being worn out. Although FIG. 11 shows the friction member 17 in the first embodiment formed with grooves. However, the friction member of another embodiment may be used. Thus, the shape of the friction member should not be limited.

Figure 12A:
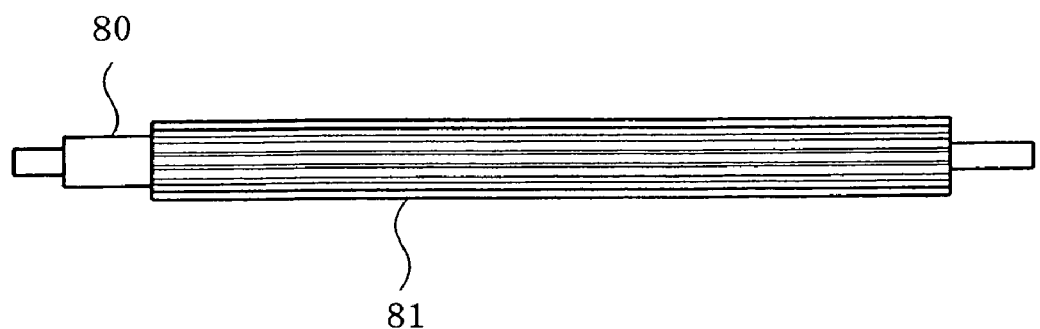
FIG. 12 shows a modified form of the shaft, and (a) shows a first example and (b) shows a second example.

Furthermore, as shown in FIG. 12(a), a plurality of axially extending grooves 81 may be formed in the outer circumference of the shaft 80, and a first example in which a section is formed into the shape of a gear.

Figure 12B:
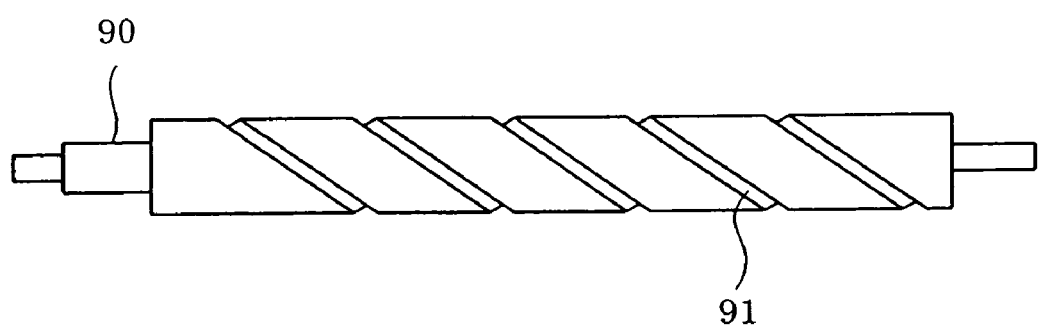

Or, as shown in FIG. 12(b), a second example in which a helical groove 91 is formed in the shaft 90 may be used. In each of the above-described examples, the same effect can be achieved as the case where the friction member 70 is formed with the concave and convex portions 71 and 72 as shown in FIG. 11.

Furthermore, the washing machine may comprise a vertical drum.

INDUSTRIAL APPLICABILITY

As described above, the drum washing machine of the invention can achieve an accurate damping force according to amplitude irrespective of rotational frequency of the drum from the suspension and is useful when the characteristics thereof are stabilized and durability is given.

The invention claimed is:

1. A drum washing machine which has a suspension for supporting a water tub for vibration proof, the water tub being enclosed in a drum, the suspension comprising:
   a cylindrical bearing support;
   a pair of bearings fixed in an interior of the bearing support;
   a shaft supported on the bearings so that the shaft is linearly reciprocated relative to the bearings;
   a cylindrical friction member damping an amplitude of the water tub by a frictional force due to friction between the shaft and the friction member resulting from relative reciprocation of the shaft, the friction member being disposed between the bearings so as to be immovable relative to the bearing support; and
   a lubricant applied between the shaft and the friction member, wherein:
   the friction member has both ends formed with abutment slant faces having outer diameters gradually reduced toward distal ends thereof, respectively, the drum washing machine further comprising a pair of holding members provided in the bearing support for holding the ends of the friction member;
gaps are defined between the friction member and the holding member respectively; and
a plurality of lubricant reservoirs are defined in the respective gaps to reserve the lubricant supplied between the shaft and the friction member.

2. The drum washing machine according to claim 1, wherein the friction member has an inner circumference, the inner circumference has two ends which have diameters, and the diameters are increased toward distal ends of said both ends respectively.

* * * * *